US007751584B2

(12) United States Patent
Zimmer et al.

(10) Patent No.: US 7,751,584 B2
(45) Date of Patent: Jul. 6, 2010

(54) METHOD TO PROVIDE TRANSPARENT INFORMATION IN BINARY DRIVERS VIA STEGANOGRAPHIC TECHNIQUES

(75) Inventors: Vincent J. Zimmer, Puyallup, WA (US); Michael A. Rothman, Gig Harbour, WA (US)

(73) Assignee: Intel Corporation, Santa Clara, CA (US)

(*) Notice: Subject to any disclaimer, the term of this patent is extended or adjusted under 35 U.S.C. 154(b) by 1289 days.

(21) Appl. No.: 10/713,294

(22) Filed: Nov. 14, 2003

(65) Prior Publication Data
US 2005/0105761 A1   May 19, 2005

(51) Int. Cl.
*G06K 9/00* (2006.01)
*H04N 1/40* (2006.01)
*H04L 9/32* (2006.01)

(52) U.S. Cl. .................. 382/100; 358/3.28; 713/176

(58) Field of Classification Search .............. None
See application file for complete search history.

(56) References Cited

U.S. PATENT DOCUMENTS 5,844,986 A * 12/1998 Davis ................... 713/187
7,036,020 B2 * 4/2006 Thibadeau ............. 713/193
2005/0169496 A1 * 8/2005 Perry .................... 382/100
2006/0010317 A1 * 1/2006 Lee ....................... 713/2

* cited by examiner

*Primary Examiner*—Charles Kim
(74) *Attorney, Agent, or Firm*—Blakely, Sokoloff, Taylor & Zafman LLP

(57) ABSTRACT

Methods for providing and extracting hidden information in firmware images using steganographic processes. Information is hidden in binary firmware images, such as drivers, using a steganographic process in which the functionality of the binaries do not change, and the size is not increased. During a pre-boot phase of a computer system, binary firmware drivers containing hidden steganographic data are identified, and a steganographic extraction process is performed to extract the hidden data. In one embodiment, a hash is employed on an authentic binary image to uniquely identify the op code content. The digest from the hash is stored in the steganographic data. In one embodiment, a vendor's private key and optional signature is used to encrypt the hash. A similar hash is performed on the binary image of a discovered binary firmware driver, and the authentic hash digest is extracted from the steganographic data. The hash digests are compared to authenticate the binary firmware driver.

18 Claims, 9 Drawing Sheets

METHOD TO PROVIDE TRANSPARENT INFORMATION IN BINARY DRIVERS VIA STEGANOGRAPHIC TECHNIQUES

FIELD OF THE INVENTION

The field of invention relates generally to computer systems and, more specifically but not exclusively relates to a technique for providing hidden information, such as authentication, versioning, watermarks, etc. in binary drivers via steganographic techniques.

BACKGROUND INFORMATION

Computer platform firmware is used during initialization of computer systems to verify system integrity and configuration. It also generally provides the basic low-level interface between hardware and software components of those computer systems, enabling specific hardware functions to be implemented via execution of higher-level software instructions contained in computer programs that run on the computer systems. In many computers, a primary portion of this firmware is known as the Basic Input/Output System (BIOS) code of a computer system. The BIOS code comprises a set of permanently recorded (or semi-permanently recorded in the case of systems that use flash BIOS) software routines that provides the system with its fundamental operational characteristics, including instructions telling the computer how to test itself when it is turned on, and how to determine the configurations for various built-in components and add-on peripherals.

In a typical PC architecture, the BIOS is generally defined as the firmware that runs between the processor reset and the first instruction of the Operating System (OS) loader. This corresponds to the startup operations performed during a cold boot or in response to a system reset. At the start of a cold boot, very little of the system beyond the processor and firmware is actually initialized. It is up to the code in the firmware to initialize the system to the point that an operating system loaded off of media, such as a hard disk, can take over.

Firmware code is commonly stored in a "monolithic" form comprising a single set of code that is provided by a platform manufacturer or a BIOS vendor such as Phoenix or AMI. Various portions of the single set of code are used to initialize different system components, while other portions are used for run-time (i.e., post-boot) operations. In other situations, a monolithic BIOS may be extended using one or more "Option ROMs" (Read Only Memory) that are contained on one or more periphery device cards. For example, SCSI device driver cards and video cards often include an option ROM that contains BIOS code corresponding to services provided by these cards. Typically, firmware in option ROMs is loaded after the firmware in the monolithic BIOS has been loaded or during loading of the monolithic BIOS in accordance with a predefined scheme.

Today's firmware architectures include provisions for extending BIOS functionality beyond that provided by the BIOS code stored in a platform's BIOS device (e.g., flash memory). More particularly, the Extensible Firmware Interface (EFI) (http://developer.intel.com/technology/efi) enables firmware, in the form of firmware modules and drivers, to be loaded from a variety of different resources, including primary and secondary flash devices, option ROMs, various persistent storage devices (e.g., hard disks, CD ROMs, etc.), and even over computer networks.

An issue of great concern for many computer vendors and users is code authenticity. While normally considered with respect to software, unauthentic firmware is also a concern. For example, unauthentic code may be flashed to a firmware storage device without the user's knowledge. The unauthentic code may comprise a virus or Trojan, causing malicious damage to the user's computer when launched. This problem is even more of a concern in a network environment, wherein the launch of a virus on one computer may cause the virus to infiltrate other computers on the network.

In many cases, vendors are averse to including authentication information, such as versioning data and the like. One reason is that conventional versioning requires overhead that is often at a premium. For example, a common way of including versioning data is to embed such data in a header of a corresponding binary file. This consumes space, and becomes even a bigger issue when considering its application to modular firmware environments such as EFI, wherein the system firmware may include 10's of different firmware binaries.

In other cases, the vendor has no choice when it comes to authentication. Existing firmware components, such as Option ROMs, have binary encodings that include pointers and other references to specific offsets (i.e., absolute address references). Thus, it is not possible to add new or additional header information, as this would cause the offsets to change, making the code inoperable.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION OF PREFERRED EMBODIMENTS

Figure 1:
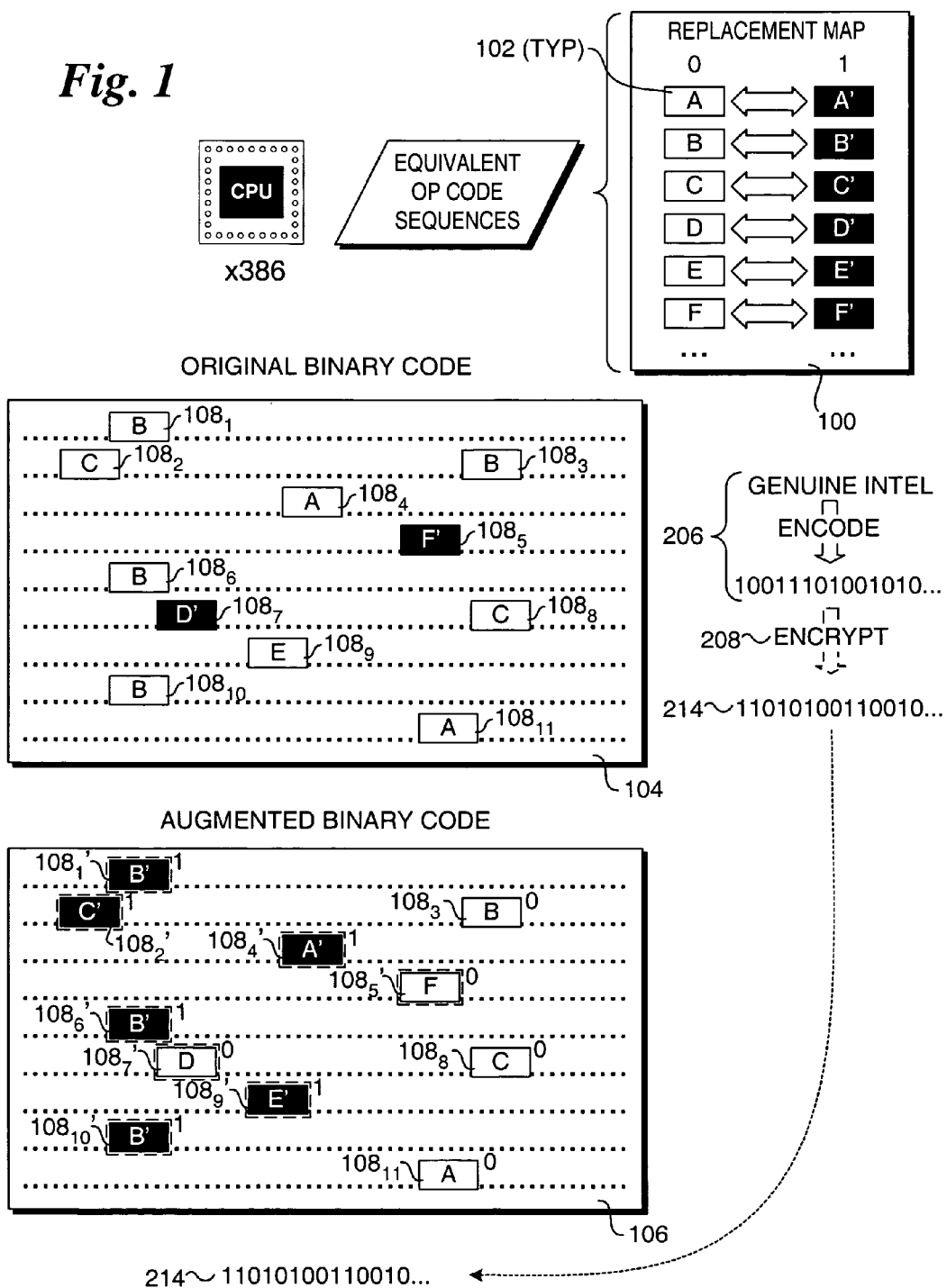
FIG. 1 is a schematic diagram illustrating aspects of a steganographic process via which hidden information may be embedded in a binary image without changing the functionality or size of the binary image.

Embodiments of methods and apparatus for providing hidden information in binary drivers via steganographic techniques are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the invention, methods are disclosed herein for embedding information in binary drivers using steganographic techniques. The word steganography literally means covered writing as derived from Greek. It includes a vast array of methods of secret communications that conceal the very existence of the message. Among these methods are invisible inks, microdots, character arrangement (other than the cryptographic methods of permutation and substitution), digital signatures, covert channels and spread-spectrum communications.

Steganography is the art of concealing the existence of information within seemingly innocuous carriers. Steganography can be viewed as akin to cryptography. Both have been used throughout recorded history as means to protect information. At times these two technologies seem to converge while the objectives of the two differ. Cryptographic techniques "scramble" messages so if intercepted, the messages cannot be understood. Steganography, in an essence, "camouflages" a message to hide its existence and make it seem "invisible" thus concealing the fact that a message is being sent altogether. An encrypted message may draw suspicion while an invisible message will not. In some instances, both cryptographic and steganographic techniques are combined to hide data.

A common steganographic technique is to embedded hidden information in digitized graphic or audio content. Typically, the information is embedded by modifying a small portion of the digital content, such as 1-5% of the pixels. For example, the digital value for every $100^{th}$ pixel might be modified in accordance with a pre-defined watermark. Because of how the eye and brain function, the modified pixels are often unperceivable to the viewer. In many instances, this process is performed in conjunction with compression of the content, which generally introduces a small loss in quality unless loss-less compression is applied. Under these circumstances, the "hidden" content is even more difficult to perceive.

However, the foregoing technique is not applicable to binary files, as changing any of the binary encoding will result in a change in the operation of the code, typically resulting in unwanted behavior. In addressing this problem, embodiments of the invention provide a steganography-based scheme under which binary images may be modified to contain hidden information while maintaining complete code functionality.

In one embodiment, a known steganographic process applicable to binary encodings is employed to store information in binary drivers. A working implementation of the process, called "Hydan," has been produced by Rakan El-Khalil of Columbia University, and is available at http://www.crazyboy.com/hydan. The general principle of the Hydan process is the replacement of original op code sequences with equivalent op code sequences. In this sense, equivalent means that the original and replaced op code sequences exhibit identical functionality, and thus the binary code as a whole retains its complete functionality. One of the benefits of the technique is that the address offsets in the binary code do not change (enabling jumps to explicit addresses), while at the same time steganographic information is embedded in the code itself.

Figure 2:
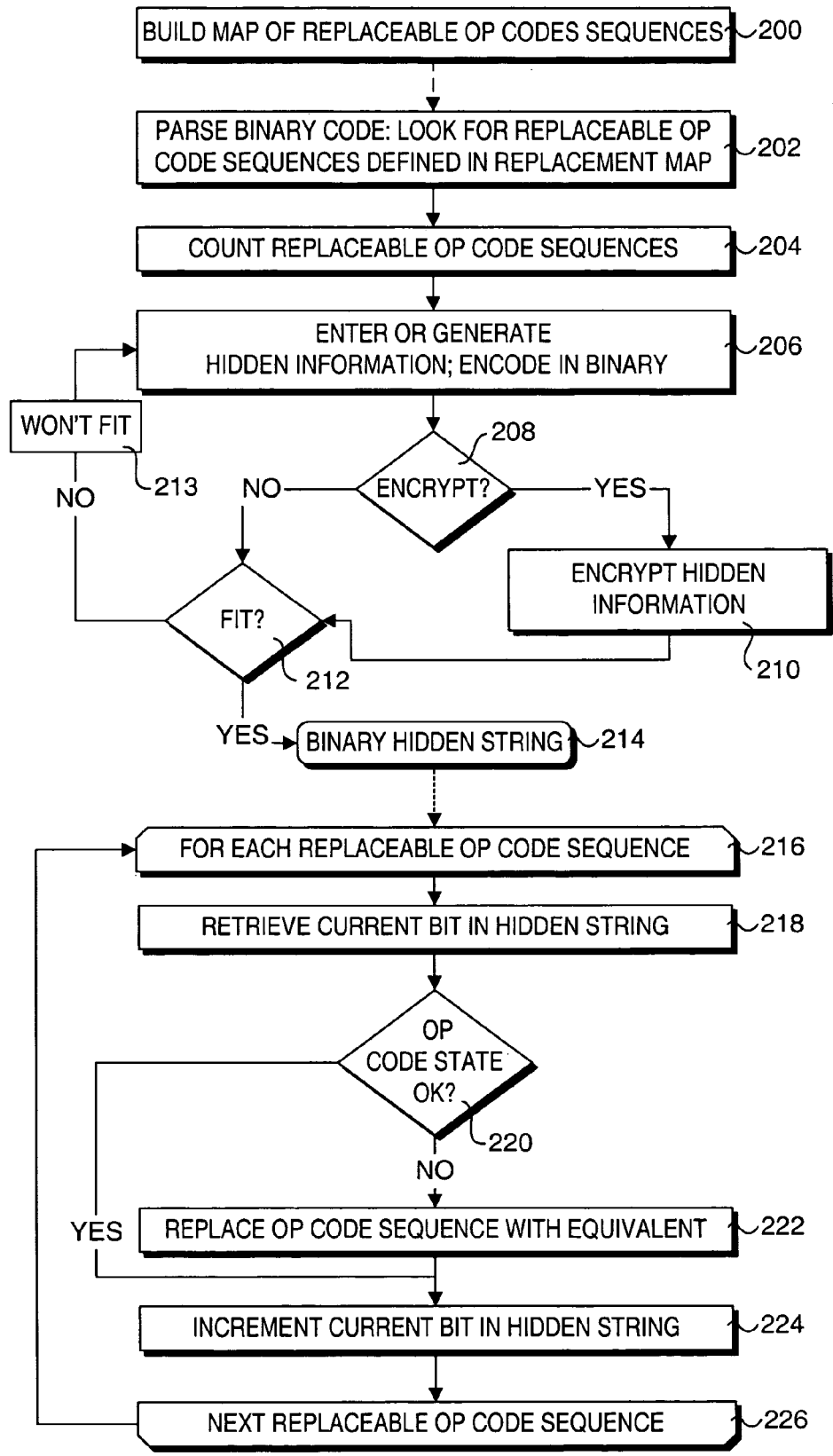
FIG. 2 is a flowchart illustrating operations and logic for implementing a steganographic process to embed information in a binary image, according to one embodiment of the invention.

An illustration of an exemplary steganographic process in accordance with the general principles of Hydan is show in FIGS. 1 and 2. It has long been recognized that many machine instruction (i.e., op code) sequences yield the same functionality. In fact, compilers are developed with this in mind. For example, many compilers have a compilation "switch" that enables the user to request that the compiler generate code that either operates faster or occupies less space. Today, most applications are compiled for faster execution, yielding increased code size as a sacrifice. In other cases, equivalent code sequences exist that yield identical performance with regard to both speed and size.

For point of illustration, one type of processors that employs op code sequence equivalents is the x386 family of processors manufactured by Intel® corporation. A simple example of equivalent op code sequences pertain to addition and subtraction operations. From a mathematical standpoint, subtracting a negative number from a register value produces the same result as adding the number to the register value. Op codes for facilitating both functions are provided in the x386 instruction set:

"add %eax, $imm" is equivalent to "sub %eax, −$imm"

In addition to the foregoing example, there are numerous op code sequence equivalents in the x386 instruction set.

In accordance with this "equivalence" principle, the first operation of the steganographic process is to build a replacement map 100 of equivalent op code sequences, as depicted by a block 200 of the flowchart of FIG. 2. In one embodiment, the replacement map comprises a list of equivalent op code sequence pairs, such as:

{"add %eax, $imm", "sub %eax, −$imm"}

In general, the replacement map may be stored as a table, a text file, programming code, a header file, or in any other form conducive to mapping op code sequences. For simplicity, each op code sequence is depicted by a block 102 in replacement map 100, wherein the letters N and N' (e.g, A⇔A', B⇔B', etc.) on the block pairs correspond to a respective first version of an op code sequence, and a corresponding equivalent op code sequence that may be used to replace the first version. It is noted that the map works both ways. The op code sequences on the right side of replacement map 100 may be used to replace those on the left side as well. For logical reasons, the op code sequences on the left column of replacement map 100 are assigned a state "0" and the op code sequences on the right column assigned a state "1". Rather than containing specific values, the replaceable op code sequences are written in a generic form that includes parameters that are configured to correspond to actual values contained in the binary targets that are to be processed.

After the replacement map is built, steganographic operations for embedding hidden information may be performed on the binary target (i.e., the binary encoding in which information is to be hidden). This process begins in a block 202, wherein the binary op code is parsed, looking for replaceable op code sequences based on the op code sequences contained in both state columns of replacement map 100. In general, a binary string compare operations may be performed using each of the op code sequences in replacement map 100 as a mask. In one embodiment, the location of each replaceable op code sequence that is found may be stored in a buffer or the like to speed up the operations in blocks 216-226 below. In one embodiment, the replaceable op code sequences are also counted in a block 204.

The location and occurrences of replaceable op code sequences in an exemplary original binary code listing 104 is shown in FIG. 1. For illustrative purposes, the op codes in the original binary code listing and an augmented binary code listing 106 shown below are not explicitly shown. More specifically, blocks $108_N$ illustrating only those op code sequences that are replaceable are shown in original binary code listing 104.

In a block 206, the information to be hidden, such as authentication and versioning data, is either entered by a user (or machine) and/or automatically generated based on the content of the binary target. For example, a watermark from which a product's origin may be identified may be hidden in the binary encoding. In the example illustrated in FIG. 1, the watermark is "Genuine Intel." In other cases, a hash or the like may be performed on the binary target to generate encrypted authentication information, including a digital signature. This offers the further advantage of indicating whether or not the binary code has been tampered with.

In a decision block 208, a determination is made to whether the hidden information is to be encrypted or not. In general, there are three classes of attacks that are applicable to this type of steganographic scheme. These include overwriting, detection, and extractions. If the steganographic scheme is known, an attacker could re-run the scheme with bogus text and embed that on top or at the end of the original hidden information. This type of attack may be easily recognized if the original hidden data is encrypted. Furthermore, even if it is detected that hidden information exists, the information may be prevented from being retrieved if the attacker does not have the key needed to decrypt the encrypted content. If the answer to decision block 208 is YES, the hidden information is encrypted in a block 210, and the logic proceeds to a decision block 212; otherwise, the logic proceeds directly to decision block 212.

In decision block 212, a determination is made to whether the hidden information (encrypted or raw) will fit within the "hidden space" afforded by the replaceable op code sequences. This relates to the purpose of the count operation in block 204; the size of the hidden message cannot be greater than the storage available for such a message. Since the ratio of replaceable op code sequences to non-replaceable sequences is variant, the amount of hidden space cannot be known in advance of the parsing operation of block 202. Furthermore, larger binaries will generally afford more hidden space than smaller binaries. For this reason, the larger binaries may be able to support a combination of hidden information, such as digital signatures, manufacturer and versioning data, etc., while a small binary may only allow a small amount of information to be hidden. If it is determined in decision block 212 that the hidden information will not fit, a message 213 indicating such is passed back to block 206; in response, new hidden information is generated. Once the hidden information is determined to fit, the process yields a binary hidden string 214 corresponding to the information that is to be hidden.

The operations of blocks 218, 220, 222, and 224 are performed for each replaceable op code sequence that was identified in block 202, as delineated by start and end loop blocks 216 and 226. In one embodiment (illustrated in FIG. 1), these operations are performed by beginning at the start of the binary target. In another embodiment, the process begins at the end of the binary target and progresses backwards (not shown). In instances in which the locations of the replaceable op codes were not recorded in block 202, the other operations of block 202 are substantially repeated to identify each replaceable op code sequence.

In block 218, the current bit of the hidden string is retrieved. In decision block 220, a determination is made to whether the current state of the op code sequence is correct. This involves a look up in replacement map 100, and then checking to see whether the current op code sequence falls in the state column corresponding to the current bit. If it falls in the same column as the bit, the op code sequence is left alone. Conversely, if it falls in the opposite column as the bit, the original op code sequence is replaced using the equivalent op code sequence defined in replacement map 100. For example, the first replaceable op code sequence to be processed is op code sequence $108_1$, while the current (first) bit in binary hidden string 214 is a "1." Since op code sequence $108_1$ has a value of "B", it has a corresponding state of "0", which is in opposite to the current bit state of "1." Therefore, op code sequence B is replaced by op code sequence B' according to replacement map 100, and op code sequence $108_1$ is relabeled $108_1'$. Similar replacement operations are performed on op code sequences $108_2$, $108_4$, $018_5$, $108_6$, $108_7$, $108_9$, and $108_{10}$, while op code sequences $108_3$, $108_8$, and $108_{11}$ are left unchanged. It is noted that the replacement map entries 102 in replacement map 100 are of generic form. As a result, the generic terms in the map are replaced with actual values in the op. code sequences that are replaced.

After the operations of blocks 220 and 222 (as applicable) are performed for the replaceable op code sequence that is currently being processed, the current bit location in the hidden string is incremented by one, and the processing of blocks 218, 220, and 222 are repeated for the next replaceable op code sequence that is encountered. This process is continued until either the end of the hidden string is reached, or until the end of the binary target is reached. In one embodiment, the length of the hidden string is appended to the string via the op code sequence replacement operations.

The result of the foregoing operations are illustrated by comparing original binary code listing 104 and augmented binary code listing 106. The op code sequences that have been replaced are shown with a dashed-line box around them and have been relabeled $108_N'$. The result is that the state of each of the replaceable op code sequences mirror the binary hidden string sequence. Although the binary encoding has been augmented via the replaced op code sequences, its functionality remains identical. Furthermore, the address offsets are unchanged. As a result, the scheme enables existing machine code to be augmented to include hidden information without needing to have the source code from which the existing code was generated.

Figure 3:
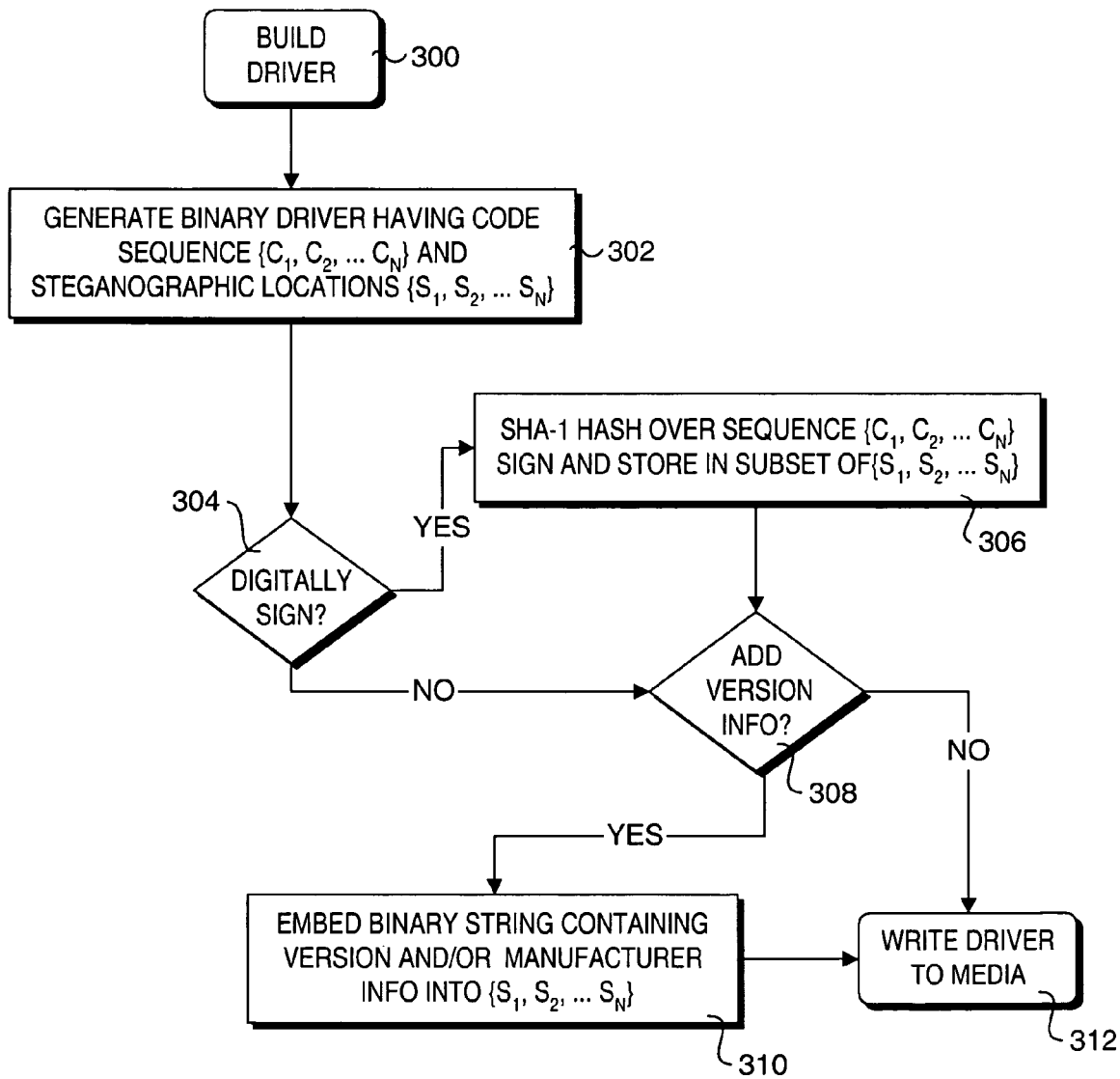
FIG. 3 is a flowchart illustrating operations and logic for building a binary firmware driver that contains steganographic data, according to one embodiment of the invention.

In accordance with one aspect of the invention, the steganographic process of FIGS. 1 and 2 is applied to binary firmware drivers. Further details of one embodiment of this process are shown in FIG. 3. The process begins in a start block 300, wherein the firmware driver is built. Typically, this will comprise building the source code for the driver. In accordance with a block 302, the source code is compiled to build a binary driver. The binary driver has an op code sequence of $\{C_1, C_2, \ldots C_N\}$, and steganographic locations corresponding to equivalent replaceable op code sequences of $\{S_1, S_2, \ldots S_N\}$, in a manner analogous to that shown in original binary code 104. During the operations in blocks 300 and 302, the code is compiled in a manner that produces desired execution qualities, without consideration of the inclusion or location of replaceable op code sequences. Generally, for binary drivers, the compilation switches will be set so as to generate a smaller amount of code when compared with other compilation options that generate faster-executing code.

In a decision block, a decision is made to whether the binary driver is to include a hidden digital signature. If YES, a digital signature is generated in a block 306. In one embodiment, the digital signature is generated by performing an SHA-1 hash over the op code sequence $\{C_1, C_2, \ldots C_N\}$. The hash result is then signed and stored in a subset of the equivalent replaceable op code sequences $\{S_1, S_2, \ldots S_N\}$ by replacing appropriate members of the sequence so as to reflect a binary string corresponding to the digital signature.

In a decision block 308, a determination is made to whether versioning information is to be added. If the answer is YES, a binary string corresponding to the version and/or manufacturer information is generated, and appropriate members of the equivalent replaceable op code sequences $\{S_1, S_2, \ldots S_N\}$ are replaced to mirror the binary string. In one embodiment, the binary string corresponding to the version and/or manufacturer information is appended to the digital signature string when it exists. The augmented binary driver is then written to an appropriate media in a block 312 to complete the firmware driver generation process.

Figure 4:
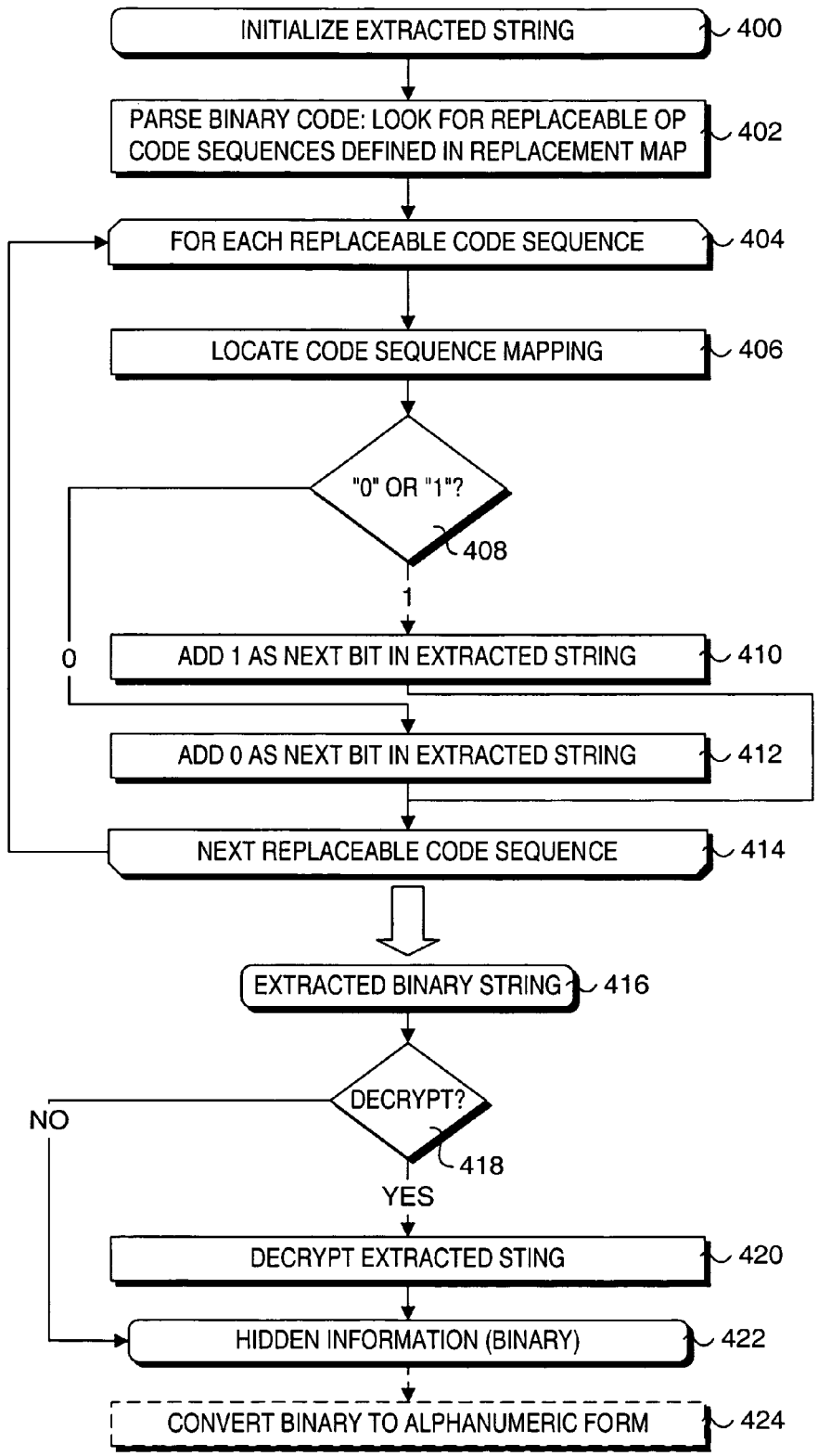
FIG. 4 is a flowchart illustrating operations and logic for extracting steganographic data from a binary image, according to one embodiment of the invention.

The flip-side of the steganographic embedding process is the steganographic extraction process. Details of one embodiment of a steganographic extraction process are shown in FIG. 4. The process begins in a start block 400 in which an extracted string is initialized. In essence, the initialization operation comprises reserving a buffer and loading the buffer with a null string.

In a block 402, the binary target is parsed in a manner similar to block 202 above, looking for replaceable op code sequences based on the op code sequences contained in both state columns of replacement map 100. The operations of blocks 404, 406, 408, and 410 are then performed for each replaceable op code sequence, as delineated by start and end loop blocks 404 and 414. In a block 406, the mapping row containing the op code sequence is located in replacement map 100. A determination in decision block 408 is then made as to whether the op code sequence falls in the "0" state column or the "1" state column. If the op code sequence falls in the "0" state column, a "0" is added as the next bit in the extracted string. If the sequence falls in the "1" state column, a "1" is added to the extracted string. The operations of blocks 406, 408, 410, and 412 are repeated until either an end marker is extracted (e.g., a series of "0's") or the end of the binary target is reached. This yields an extracted binary string 416.

Figure 5:
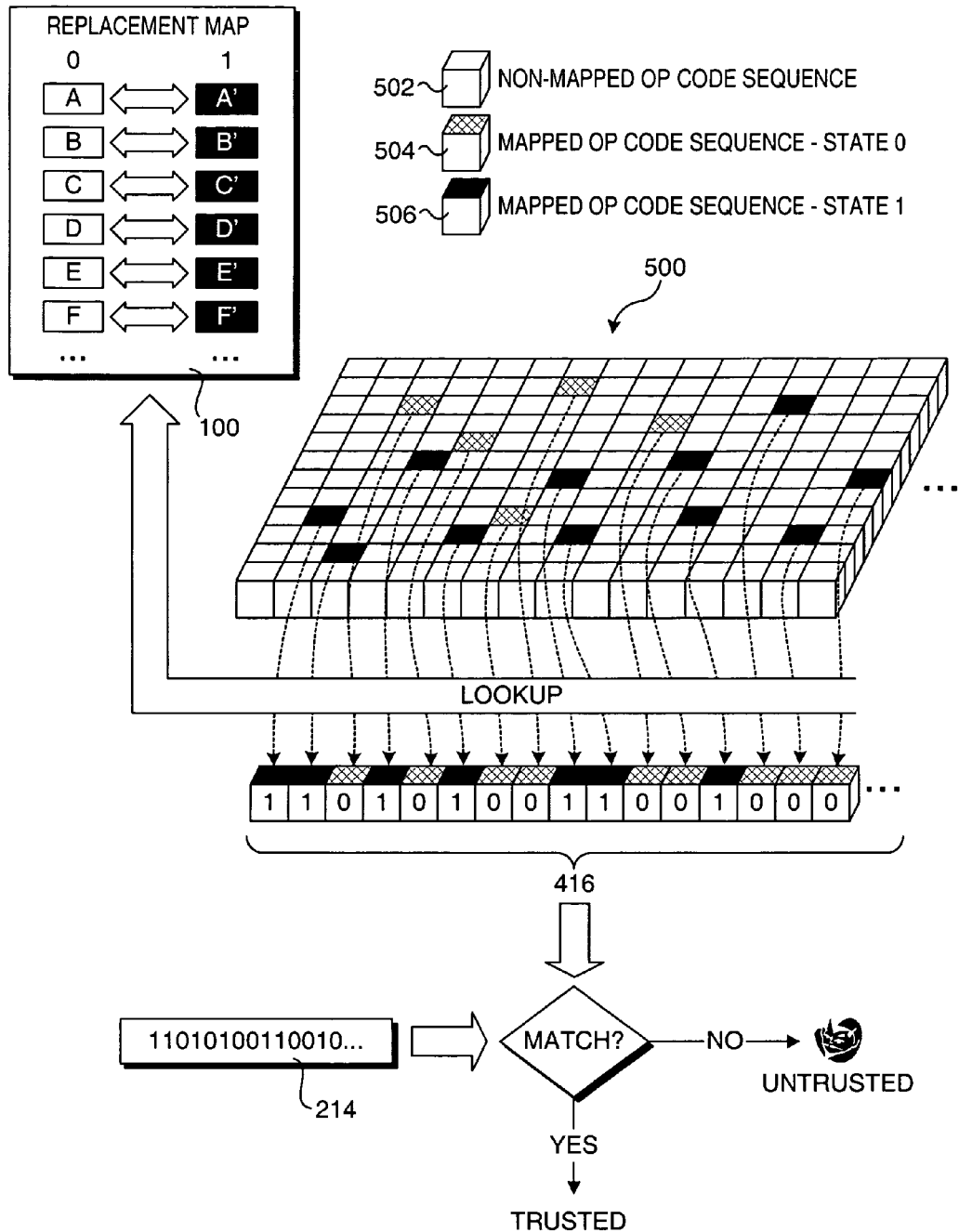
FIG. 5 is a schematic diagram pictorially illustrating the extraction of steganographic data in accordance with the flowcharts of FIGS. 4 and 6.

Details of the operations performed in blocks 402-414 are pictorially illustrated in FIG. 5. The operations are performed on a binary target 500 containing various op codes sequences, including both mapped op code sequence 504 and 506 and unmapped op code sequences 502. For each mapped sequence, a lookup is made to replacement map 100 to determine the logical state of the sequence. These operations are performed sequentially through binary target 500 to yield extracted binary string 416.

Returning to FIG. 4, the next set of operations are performed on the extracted binary string 416. First, a determination is made in a decision block 418 to whether a decryption operations needs to be performed. This determination can be made by one of several means. For example, the binary string may appear unrecognizable when converted to an alphanumeric form. It also may contain indicia to indicate if it is encrypted, possibly even identifying a type of encryption used (via a vendor encryption code, for example). In other instances, the binary target type may identify whether or not the hidden binary string is expected to be encrypted.

If the answer to decision block 418 is YES, the extracted string is decrypted using an appropriate decryption algorithm in a block 420, yielding binary hidden information 422. If not, extracted binary string and binary hidden information 422 are one in the same.

Generally, the authentication operations implemented by string comparisons will be performed on binary strings, so no further processing of binary hidden information 422 is needed. However, in some instances it may be desired to apprise the user or a system environment log of what the content of the extracted hidden information is. For example, it may be desired to tell a system environment log that a particular Option Rom produced by a certain vendor was authenticated. In other instances, extracted versioning information may be beneficial in configuring an operation system.

Figure 6A:
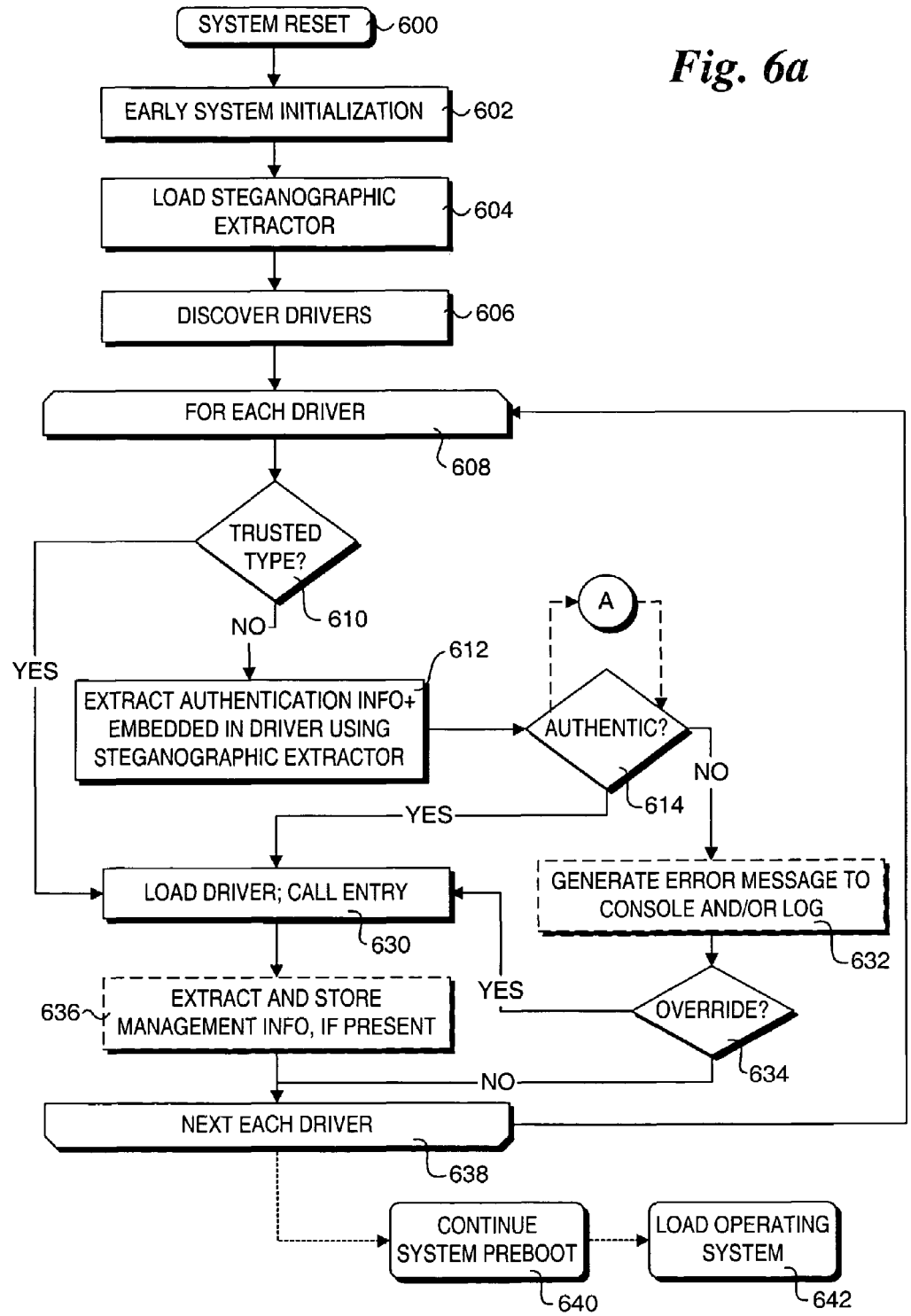
FIGS. 6a and 6b collectively comprises a flowchart illustrating operations and logic performed during a computer system pre-boot phase during which steganographic data are extracted from binary firmware drivers, and the drivers are authenticated, according to one embodiment of the invention.
Figure 6B:
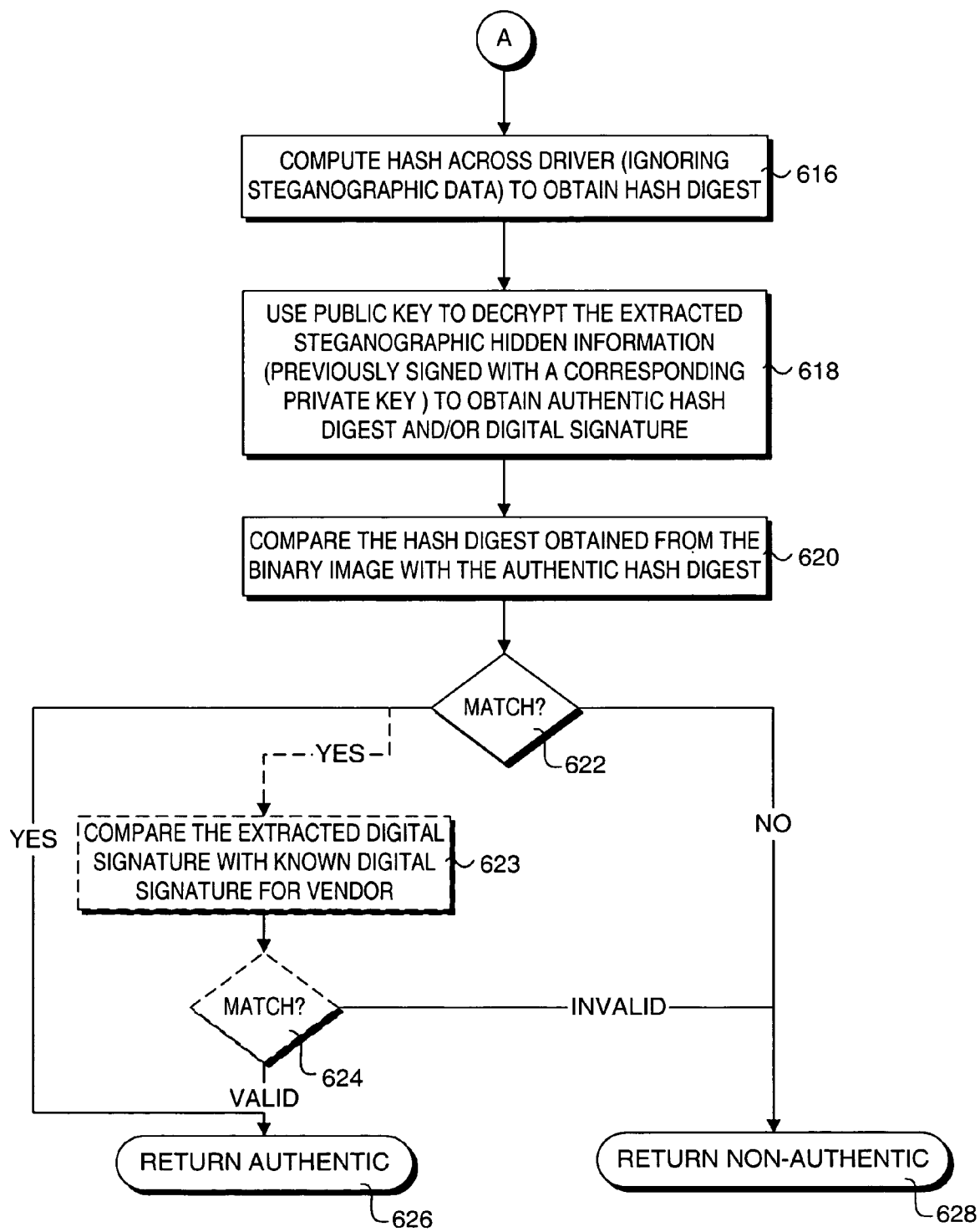

As discussed above, the steganographic embedding and extraction processes described herein may be implemented for use in firmware drivers and the like. In particular, it is often desirable to be able to verify the integrity of a firmware driver prior to its load or execution. An exemplary firmware driver authentication process corresponding to this situation is shown in FIGS. 6a and 6b.

The process begins in a block 600 with a system reset. In response, early system initialization operations are performed during a pre-boot phase, as depicted by a block 602. These operations will typically include memory initialization, system POST test operations, configuration checks, etc. During an earlier portion of the pre-boot phase, a firmware component comprising a steganographic extractor is loaded in a block 604. The steganographic extractor comprises a set of instructions to perform steganographic extraction operations, along with data corresponding to replacement map 100. The steganographic extractor may be embodied as a single module (e.g., an EFI driver), or multiple modules or components. For example, data corresponding to the replacement map, along with other lookup data, may be stored in a separate file that is accessible during the pre-boot. It may also be embodied as part of an existing component, such as an EFI image loader.

In a block 606, the initialization process continues with driver discovery. In some firmware environments, such as EFI, various firmware functionality is provided via corresponding firmware drivers that are loaded from both internal (to the computer system) and external firmware storage. For example, external firmware storage may correspond to an Option ROM, or firmware that is loaded via a network firmware volume, while internal firmware storage may comprise firmware drivers stored on a firmware boot device, such as a flash component mounted to the system's motherboard. For each firmware driver that is discovered, the operations delineated by start and end loop blocks 608 and 636 are performed, as follows.

In a block 610, a determination is made to whether the firmware driver is a trusted type. For instance, drivers discovered on external firmware storage devices will generally be deemed untrustworthy, while drivers discovered in a boot firmware device are trustworthy. In some cases, the trustworthiness of a set of drivers stored on a common firmware device may be performed, such that the operation of block 610 is only performed once for the set. If the firmware driver type is found to be trusted, the logic proceeds to a block 630 in which the driver is loaded. In one embodiment, this comprises calling an entry point in the firmware driver.

If the firmware driver is an untrustworthy type, the logic proceeds to a block 612, in which embedded steganographic authentication information, such as a digital signature, is extracted via execution of the steganographic extractor. For example, data corresponding to replacement map 100 may be used to identify op code sequences assigned to state "0" (504) and state "1" (506) in binary target 500 of FIG. 5. It is noted that the data used for extraction need not be in the pair-wise form of replacement map 100. Rather, a list of op code sequences and their respective states may be used.

In a decision block 614, a determination is made to whether the driver is authenticated via the extracted authentication information. In one embodiment, the authentication process begins in a block 616 of FIG. 6b by computing a hash across the binary driver image to obtain a hash digest, wherein the op codes corresponding to the steganographic data are not considered. For example, the binary hash is calculated based on only the non-mapped op code sequences 502 of binary target 500, while ignoring the mapped op code sequences assigned to state "0" (504) and state "1" (506).

In a block 618, the public key stored on the computer system is then used to decrypt the extracted hidden information (which in one embodiment was signed with a vendor's signature and encrypted using a corresponding private key as described below) to produce the authentic hash digest. The image hash digest obtained in block 616 is then compared with the authentic hash digest in a block 620.

In a decision block 622, a determination is made to whether the hashes match. If they do, in one embodiment the logic proceeds to an optional block 623 if a digital signature exits, and the extracted digital signature is compared with a known digital signature for the vendor that supplies the firmware image. A determination is then made in a decision block 624 to whether the digital signatures match, indicating the digital signature is valid. If the digital signature is valid, indicia indicating the binary image is authentic is returned in a return block 626. For such authenticated drivers, the logic then proceeds to block 630 to load the driver. If digital signatures are not used, the logic may proceed directly form a YES answer to decision block 622 to return block 626.

If it is determined in decision block 622 that the hashes do not match, or it is determined in decision block 624 that the signature is invalid, then indicia indicating the binary image is non-authentic is returned in a return block 628. This results in a NO answer to decision block 614. In response, an optional error message may be generated that can be viewed via a pre-boot user console and/or stored in a system environment log or the like, as depicted by a block 632. Generally, it will be desired not to load untrustworthy drivers. However, in one embodiment a user may select to override a default behavior of "do not load untrusted" (i.e., non-authentic) firmware in accordance with a decision block 634. A YES answer to decision block 634 will cause the untrusted firmware driver to be loaded in the ordinary manner in block 630.

In one embodiment, asset management and the like can be performed in connection with the steganography processes. For example, a system administrator or IT manager may wish to catalog asset information that includes the versions and manufacturers of various firmware components. In accordance with this aspect, asset management-related data are extracted and stored in an optional block 636.

The logic and operations of blocks 610-636 are repeated for each of the discovered drivers until all of the applicable drivers are processed. Upon completion, the system pre-boot operations are continued in a continuation block 640 in preparation for loading an operating system in a block 642.

In addition to using the steganographic processes for authenticity and asset management purposes, the teachings herein may be applied to support configuration control operations. For example, computer system original equipment manufacturers (OEMs), such as Dell, HP, Compaq, IBM, Gateway, etc., often have to deal with the headache of providing technical support for literally 10's of thousands of different configurations. Under the open architecture provided by the personal computer (PC) architecture, there are thousands of peripheral components and add-on cards provided by hundreds of third party vendors that may be employed in a given computer system platform. Ideally, compatibility issues should not be a problem, as long as all components are designed to adhere to all of the applicable standards. However, this is far from guaranteed. Furthermore, firmware additions, such as Option ROMs, add to the complexity of configuration management.

In some instances, an OEM will only warrant a computer system if it uses certified peripheral components and add-on cards. These third-party vendor supplied components are verified for proper operation and compatibility by the OEM through testing and the like. Upon passing the test, the peripheral component or add-on card is certified for use in one or more particular computer systems.

But what happens when the vendor changes its firmware, while leaving the model number the same? A particular piece of hardware may be listed as certified, while in reality that piece of hardware has never been tested on the computer system platform when using the new firmware. In this instance, it may be desired to either disable use of the new firmware, or at least inform the user that it has not been authenticated.

Figure 7:
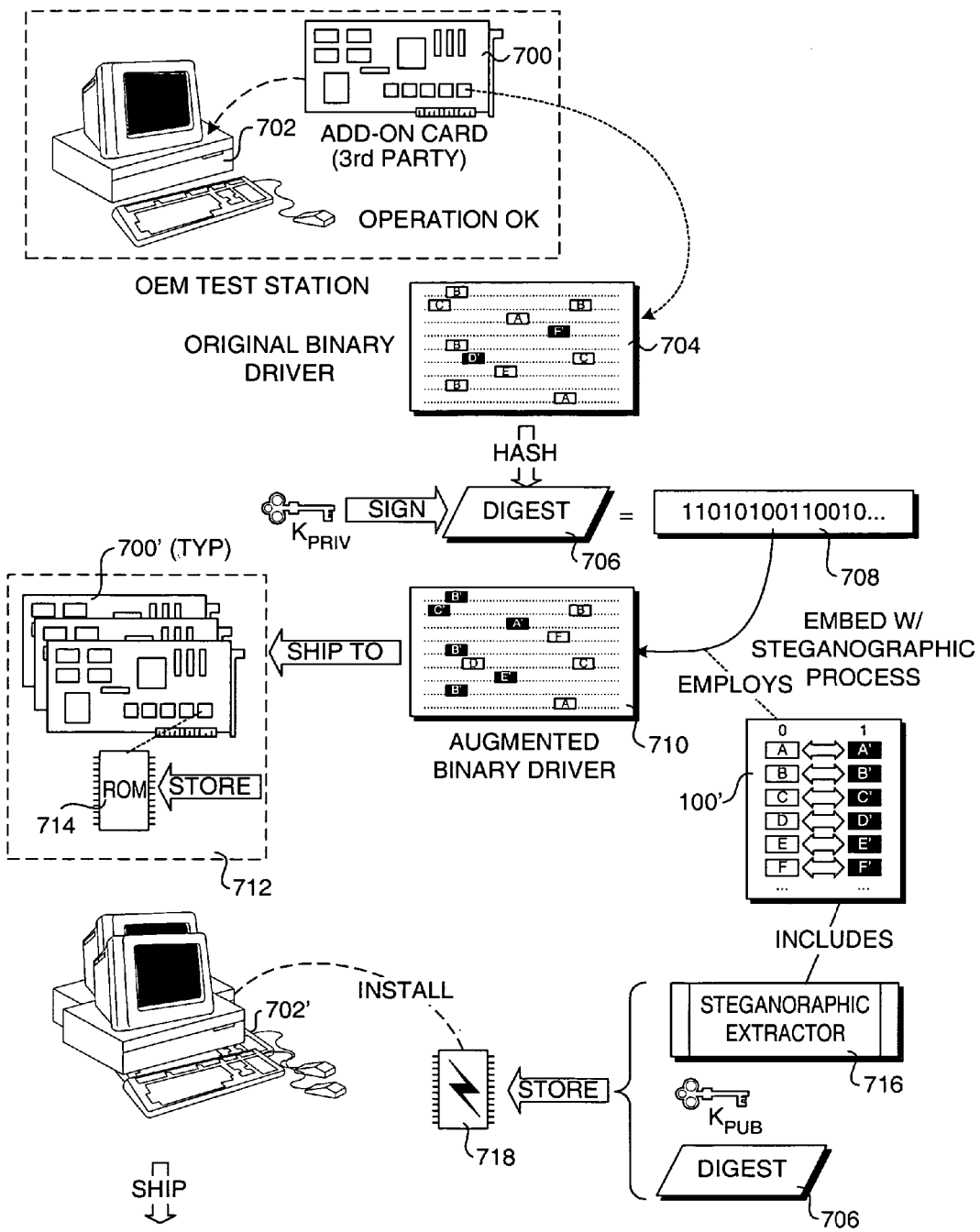
FIG. 7 is a schematic diagram pictorially illustrating a process under which an embodiment of the invention may be used by vendors to assist in performing configuration control of computer system platforms.

With reference to FIG. 7, in one embodiment the firmware from third party vendors may be certified and verified in the following manner. The process begins by having the OEM test the operation of a third party vendor-supplied add-on card 700 on a computer system platform 702. If the add-on card is deemed to be compatible, an image of the original binary driver 704 is extracted. A hash is then performed on the op codes in the original binary driver that are exclusive to the steganographic op code sequence candidates (i.e., replaceable op code sequences as defined by a equivalent op code sequence replacement map 100'). This yields a digest 706, which is signed using a private key $K_{PRIV}$ owned by the OEM to produce authentication binary string 708.

Using one of the steganographic process embodiments discussed above, the authentication binary string 708 is embedded in the original binary driver 704 via equivalent op code sequence replacements to form an augmented binary driver 710. The steganographic process is performed using the equivalent op code sequence replacement map 100'.

The augmented binary driver 710 is then shipped (e.g., sent on a disk or delivered via e-mail) to the third-party vendor 712 for add-on card 700. The third-party vendor then stores the augmented binary driver in an Option ROM 714 for each of add-on cards 700'. From the standpoint of the third-party vendor, the binary firmware driver in the Option ROMs of add-on cards 700 and 700' provide identical functionality. However, the augmented binary drivers now contain hidden authentication credentials.

The next set of operations are performed by the OEM. The OEM builds a steganographic extractor 716 that includes op code sequence references found in replacement map 100'. The OEM then stores steganographic extractor 716 along with a public key $K_{PUB}$ and a copy of digest 706 in a firmware storage device 718. The firmware storage device 718, such as a flash device, is then installed in each of a plurality of computer systems 702' that are shipped to customers.

Thus, each of computer systems 702' is equipped with a means for authenticating the binary firmware driver for add-on card 700. Furthermore, this scheme supports authentication of downloadable upgrades to the binary firmware driver. For example, a downloaded binary firmware driver image could be processed in a similar manner as the binary firmware driver that originally came with the add-on card. Notably, in this instance the hash digest will be different (due to different op codes sequences for the updated driver). However, the steganographic hidden information can still be used to hold a digital signature of the add-on card's vendor, encrypted using the vendors private key. Since the corresponding public key is already present on computer system 702', the computer system is equipped to extract the digital signature.

Figure 8:
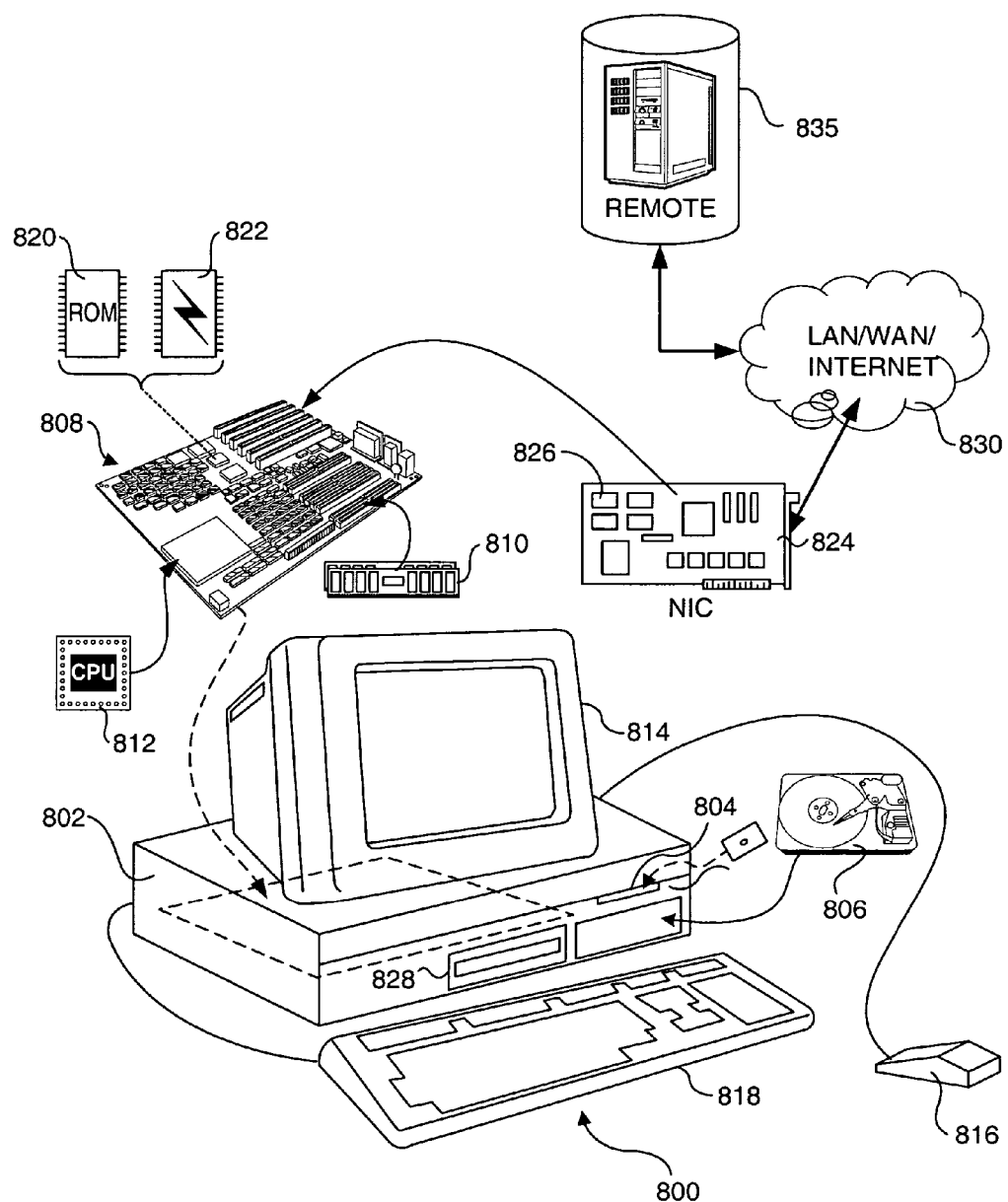
FIG. 8 is a schematic diagram illustrating a computer system under which embodiments of the invention may be practiced.

FIG. 8 illustrates an embodiment of an exemplary computer system 800 to practice embodiments of the invention described above. Computer system 800 is generally illustrative of various types of computer devices, including personal computers, laptop computers, workstations, servers, etc. For simplicity, only the basic components of the computer system are discussed herein. Computer system 800 includes a chassis 802 in which various components are housed, including a floppy disk drive 804, a hard disk 806, a power supply (not shown), and a motherboard 808. Hard disk 806 may comprise a single unit, or multiple units, and may optionally reside outside of computer system 800. The motherboard 808 includes a memory 810 coupled to one or more processors 812. Memory 810 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. Processor 812 may be a conventional microprocessor including, but not limited to, a CISC (complex instruction set computer) processor, such as an Intel Corporation x86, Pentium, or Itanium family microprocessor, a Motorola family microprocessor, or a RISC (reduced instruction set computer) processor, such as a SUN SPARC processor or the like.

The computer system 800 also includes one or more non-volatile memory devices on which firmware is stored. Such non-volatile memory devices include a ROM device 820 or a flash device 822. Other non-volatile memory devices include, but are not limited to, an Erasable Programmable Read Only Memory (EPROM), an Electronically Erasable Programmable Read Only Memory (EEPROM), or the like. The computer system 800 may include other firmware devices as well (not shown).

A monitor 814 is included for displaying graphics and text generated by firmware, software programs and program modules that are run by computer system 800, such as system information presented during system boot. A mouse 816 (or other pointing device) may be connected to a serial port, USB (Universal Serial Bus) port, or other like bus port communicatively coupled to processor 812. A keyboard 818 is communicatively coupled to motherboard 808 in a similar manner as mouse 816 for user entry of text and commands. In one embodiment, computer system 800 also includes a network interface card (NIC) or built-in NIC interface (not shown) for connecting computer system 800 to a computer network 830, such as a local area network (LAN), wide area network (WAN), or the Internet. In one embodiment, network 830 is further coupled to a remote computer 835, such that computer system 800 and remote computer 835 can communicate. In one embodiment, a portion of the computer system's firmware is loaded during system boot from remote computer 835.

The illustrated embodiment further includes an optional add-in card 824 (Illustrative of add-on card 700, for example) that is coupled to an expansion slot of motherboard 808. In one embodiment, add-in card 824 includes an Option ROM 826 on which firmware is stored. Computer system 800 may also optionally include a compact disk-read only memory ("CD-ROM") drive 828 into which a CD-ROM disk may be inserted so that executable files, such as an operating system, and data on the disk can be read or transferred into memory 810 and/or hard disk 806. Other mass memory storage devices may be included in computer system 800.

In another embodiment, computer system 800 is a handheld or palmtop computer, which are sometimes referred to as Personal Digital Assistants (PDAs). Handheld computers may not include a hard disk or other mass storage, and the executable programs are loaded from a corded or wireless network connection into memory 810 for execution by processor 812. A typical computer system 800 will usually include at least a processor 812, memory 810, and a bus (not shown) coupling the memory 810 to the processor 812.

It will be appreciated that in one embodiment, computer system 800 is controlled by operating system software that includes a file management system, such as a disk operating system, which is part of the operating system software. For example, one embodiment of the present invention utilizes Microsoft Windows® as the operating system for computer system 800. In another embodiment, other operating systems such as, but not limited to, an Apple Macintosh® operating system, a Linux-based operating system, the Microsoft Windows CE® operating system, a Unix-based operating system, the 3Com Palm® operating system, or the like may also be use in accordance with the teachings of the present invention.

Thus, embodiments of this invention may be used as or to support a firmware and software code executed upon some form of processing core (such as processor 812) or otherwise implemented or realized upon or within a computer-readable storage medium. A computer-readable storage medium includes any mechanism that provides (i.e., stores and/or transmits) information in a form readable by a machine (e.g., a computer, network device, personal digital assistant, manufacturing tool, any device With a set of one or more processors, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
    building a steganographic extractor to extract hidden information contained in binary images.
    loading the steganographic extractor during a pre-boot phase of a computer system;
    discovering, during the pre-boot phase, binary firmware images on which a steganographic operation has been performed to generate hidden information contained within each binary firmware image;
    extracting, via the steganographic extractor during the pre-boot phase, the hidden information contained in each binary firmware image discovered;
    obtaining a digital signature contained in the hidden information that is extracted from one of the binary firmware images;
    comparing the digital signature with a known authentic digital signature to determine an authenticity of that binary firmware image;
    providing a notification message to at least one of a user and a system environment log indicating the binary firmware image could not be authenticated;
    providing the user with an option to load the binary firmware image that could not be authenticated; and
    loading the binary firmware image in response to the request by the user.

2. The method of claim 1, further comprising: loading the binary firmware image if it is determined that the digital signature that is extracted matches the known authentic digital signature.

3. The method of claim 1, wherein the extracted hidden information extracted contains at least one of manufacturer and versioning information, the method further comprising:
    obtaining said at least one of manufacturer and versioning information from the hidden information; and
    storing said at least one of manufacturer and versioning information in an asset management log.

4. The method of claim 1, further comprising:
    discovering both binary firmware images having hidden information and binary firmware images not having hidden information during the pre-boot phase;
    determine whether each of the binary firmware images is a trusted type or a non-trusted type; and
    directly loading a binary firmware image if it is determined to be a trusted type.

5. The method of claim 1, wherein the binary firmware images discovered in a boot firmware device are deemed to be of trusted type, while binary firmware images stored in firmware storage that is external to the boot firmware device are deemed to be of non-trusted type.

6. The method of claim 1, wherein the steganographic extractor includes a replacement map that maps equivalent sequences of op codes to one another, with one of the equivalent op code sequences assigned a "0" state and the other assigned a "1" state, the method further comprising:
    parsing a binary firmware image to identify replaceable op code sequences defined by the replacement map;
    for each replaceable op code sequence found,
        determining whether it corresponds to a "0" or a "1" state; and
        adding the "0" or "1" state to an extracted binary string for holding the extracted hidden information.

7. The method of claim 6, wherein the binary firmware image is parsed backward, beginning with the end of the image.

8. The method of claim 6, wherein the extracted binary string contains encrypted information, the method further comprising decrypting the extracted binary string.

9. The method of claim 6, further comprising converting the extracted binary string into an alphanumeric form.

10. A computer-readable storage medium to provide instructions, which when executed perform operations, including:
    loading a steganographic extractor during a pre-boot phase of a computer system;
    discovering, during the pre-boot phase, binary firmware images on which a steganographic operation has been performed to generate hidden information embedded within each binary firmware image;
    extracting, via the steganographic extractor during the pre-boot phase, the hidden information contained in each binary firmware image discovered;
    obtaining a digital signature contained in the hidden information that is extracted from one of the binary firmware images;
    comparing the digital signature with a known authentic digital signature to determine an authenticity of that binary firmware image;
    providing a notification message to at least one of a user and a system environment log indicating the binary firmware image could not be authenticated;
    providing the user with an option to load the binary firmware image that could not be authenticated; and
    loading the binary firmware image in response to the request by the user.

11. The computer-readable storage medium of claim 10, wherein the media further includes instructions embodied as the steganographic extractor.

12. The computer-readable storage medium of claim 10, further comprising instructions for performing the operations comprising of:
    determining op code sequences that are identifiable to the steganographic extractor as representing steganographic data;
    performing a hash on a portion of a binary firmware image that includes op codes that are exclusive of the op code sequences that represent steganographic data to obtain an image hash digest;
    extracting an authenticated hash digest from the hidden information; and
    comparing the image hash digest to the authenticated hash digest to determine an authenticity of the binary firmware image.

13. The computer-readable storage medium of claim 12, further comprising instructions for performing the operations comprising of:
    retrieving a decryption key; and
    decrypting the hidden information that is extracted with the decryption key to obtain the authenticated hash digest.

14. The computer-readable storage medium of claim 10, wherein the hidden information includes asset management information, and the computer-readable storage medium further includes instructions for performing the operations comprising of:
    retrieving the asset management information from the hidden information that is extracted; and
    storing the asset management information that is retrieved.

15. A system comprising:
    a processor;

a memory, coupled with the processor;

a flash device, coupled with the processor and having firmware instructions stored therein, which when executed perform operations including:

loading a steganographic extractor during a pre-boot phase of a computer system into the memory;

discovering, during the pre-boot phase, binary firmware images containing hidden information that was embedded via a steganographic operation;

extracting, via the steganographic extractor during the pre-boot phase, the hidden information contained in each binary firmware image that is discovered;

obtaining a digital signature contained in the hidden information that is extracted from one of the binary firmware images;

comparing the digital signature with a known authentic digital signature to determine an authenticity of that binary firmware image;

providing a notification message to at least one of a user and a system environment log indicating the binary firmware image could not be authenticated;

providing the user with an option to load the binary firmware image that could not be authenticated; and loading the binary firmware image in response to the request by the user.

16. The system of claim 15, wherein the flash device further includes firmware instructions embodied as the steganographic extractor.

17. The system of claim 15, wherein the flash device further includes firmware instructions for performing the operations comprising of:

determining op code sequences that are mapped to identify steganographic data;

performing a hash on a portion of a binary firmware image that includes op codes that are exclusive of the op code sequences that are mapped to identify steganographic data to obtain an image hash digest;

extracting an authenticated hash digest from the hidden information; and comparing the image hash digest to the authenticated hash digest to determine an authenticity of the binary firmware image.

18. The system of claim 17, wherein the hidden information is encrypted via a private key and wherein the flash device further includes firmware instructions for performing the operations comprising of:

retrieving a public key stored in the computer system corresponding to the private key; and employing the public key to decrypt the hidden information that is extracted from one of the binary firmware images.

* * * * *